US009836594B2

(12) United States Patent
Zhang et al.

(10) Patent No.: US 9,836,594 B2
(45) Date of Patent: *Dec. 5, 2017

(54) SERVICE CHANNEL AUTHENTICATION TOKEN

(71) Applicant: Bank of America Corporation, Charlotte, NC (US)

(72) Inventors: Xianhong Zhang, Issaquah, WA (US); Andrew T. Keys, Albany, OR (US); Kapil Pruthi, Bothell, WA (US); Daniel Lynn Carpenter, Matthews, NC (US); Mark A. Pender, Morrestown, NJ (US); Spencer Yezo, Millstone, NJ (US); Apeksh M. Dave, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/280,849

(22) Filed: May 19, 2014

(65) Prior Publication Data

US 2015/0334099 A1    Nov. 19, 2015

(51) Int. Cl.
*H04L 29/06* (2006.01)
*G06F 21/44* (2013.01)
(Continued)

(52) U.S. Cl.
CPC ............. *G06F 21/44* (2013.01); *G06F 21/45* (2013.01); *G06F 21/73* (2013.01); *H04L 29/06* (2013.01);
(Continued)

(58) Field of Classification Search
CPC . H04L 63/10; H04L 63/0807; H04L 63/0823; H04L 9/3226; H04L 9/3213;
(Continued)

(56) References Cited

U.S. PATENT DOCUMENTS 5,032,708 A     7/1991  Comerford et al.
6,041,411 A  *  3/2000  Wyatt ..................... G06F 21/10
                                                            380/27
(Continued)

OTHER PUBLICATIONS

"Device Fingerprint," Wikipedia, captured Apr. 17, 2014, pp. 1-4.

*Primary Examiner* — John B King
(74) *Attorney, Agent, or Firm* — Banner & Witcoff, Ltd.; Michael A. Springs

(57) ABSTRACT

A computer system receives an authentication request from a user device and determines a determined device identification from a set of received device attributes. When the device is properly authenticated, the computer system generates an authentication token that is signed by the determined device identification and returns the authentication token to the user device. When the computer system subsequently receives a service request with an authentication token and a plurality of device attributes for a protected resource from a user device, the computer system determines a derived device identification from some or all of the received device attributes. When a signed device identification of the authentication token and the derived device identification are equal, the apparatus continues processing the service request. Otherwise, the service request is rejected.

12 Claims, 12 Drawing Sheets

(51) Int. Cl.
*G06F 21/45* (2013.01)
*G06F 21/73* (2013.01)

(52) U.S. Cl.
CPC .......... *H04L 63/08* (2013.01); *H04L 63/0807* (2013.01); *H04L 63/0838* (2013.01); *H04L 63/0861* (2013.01); *H04L 63/0876* (2013.01); *H04L 63/10* (2013.01); *H04L 63/105* (2013.01)

(58) Field of Classification Search
CPC ..... H04L 63/0853; H04L 29/06; H04L 63/08; H04L 63/0838; H04L 63/0861; H04L 63/0876; H04L 63/105; G06F 21/44; G06F 21/45
USPC .......................................... 726/2, 3, 6, 9, 10
See application file for complete search history.

(56) References Cited

U.S. PATENT DOCUMENTS

| | | | |
|---|---|---|---|
| 6,084,967 A | 7/2000 | Kennedy et al. | |
| 6,163,383 A | 12/2000 | Ota et al. | |
| 6,173,400 B1 | 1/2001 | Perlman et al. | |
| 6,385,724 B1 | 5/2002 | Beckman et al. | |
| 6,604,198 B1 | 8/2003 | Beckman et al. | |
| 6,725,257 B1* | 4/2004 | Cansler ................ G06Q 10/087 709/203 | |
| 7,171,202 B2 | 1/2007 | Chen et al. | |
| 7,299,364 B2 | 11/2007 | Noble et al. | |
| 7,302,571 B2 | 11/2007 | Noble et al. | |
| 7,346,587 B2 | 3/2008 | Goldstein et al. | |
| 7,380,121 B2 | 5/2008 | Nomura et al. | |
| 7,386,877 B2 | 6/2008 | Winiger et al. | |
| 7,392,375 B2 | 6/2008 | Bartram et al. | |
| 7,434,063 B2 | 10/2008 | Watanabe | |
| 7,506,183 B2 | 3/2009 | Araya | |
| 7,509,488 B2 | 3/2009 | Isozaki | |
| 7,627,505 B2 | 12/2009 | Yoshida et al. | |
| 7,673,135 B2 | 3/2010 | Chin et al. | |
| 7,865,738 B2 | 1/2011 | Buck et al. | |
| 8,032,922 B2 | 10/2011 | Bhatia et al. | |
| 8,073,770 B2 | 12/2011 | Cole et al. | |
| 8,090,944 B2 | 1/2012 | Lee | |
| 8,095,381 B2 | 1/2012 | Simons et al. | |
| 8,099,770 B2 | 1/2012 | Makkinejad | |
| 8,141,140 B2 | 3/2012 | Wenzel et al. | |
| 8,171,531 B2 | 5/2012 | Buer | |
| 8,214,888 B2 | 7/2012 | Noe et al. | |
| 8,266,681 B2 | 9/2012 | Deshpande et al. | |
| 8,302,167 B2 | 10/2012 | Mennes et al. | |
| 8,312,272 B1 | 11/2012 | Serenyi et al. | |
| 8,316,425 B2 | 11/2012 | Cattrone et al. | |
| 8,332,626 B2 | 12/2012 | Mansfield | |
| 8,347,096 B2 | 1/2013 | Hoornaert et al. | |
| 8,375,212 B2 | 2/2013 | Buck et al. | |
| 8,442,915 B2 | 5/2013 | Takatori et al. | |
| 8,522,326 B2 | 8/2013 | Merchant et al. | |
| 8,560,841 B2 | 10/2013 | Chin et al. | |
| 8,572,713 B2 | 10/2013 | Buer | |
| 8,590,018 B2 | 11/2013 | Thavasi et al. | |
| 8,600,581 B2 | 12/2013 | Lee | |
| 8,656,472 B2* | 2/2014 | McMurtry ............ G06F 21/335 713/185 | |
| 8,670,139 B2 | 3/2014 | Sako | |
| 8,688,990 B2 | 4/2014 | Buck et al. | |
| 8,689,309 B2 | 4/2014 | Saran et al. | |
| 8,812,851 B2* | 8/2014 | Schwarz ................ G06F 21/33 713/155 | |
| 8,818,906 B1* | 8/2014 | Szwalbenest ....... H04L 63/0876 705/64 | |
| 8,943,598 B1* | 1/2015 | Kurian .................... G06F 21/56 726/22 | |
| 9,098,850 B2* | 8/2015 | Weiner ................ H04W 12/06 | |
| 9,380,026 B2* | 6/2016 | Baca ..................... H04L 9/3228 | |
| 2002/0095588 A1 | 7/2002 | Shigematsu et al. | |
| 2003/0005300 A1 | 1/2003 | Noble et al. | |
| 2003/0048173 A1 | 3/2003 | Shigematsu et al. | |
| 2003/0084289 A1 | 5/2003 | Watanabe | |
| 2003/0158815 A1 | 8/2003 | Yoshida et al. | |
| 2003/0182581 A1 | 9/2003 | Isozaki | |
| 2003/0212894 A1 | 11/2003 | Buck et al. | |
| 2004/0010715 A1 | 1/2004 | Winiger et al. | |
| 2004/0039909 A1 | 2/2004 | Cheng | |
| 2004/0049684 A1 | 3/2004 | Nomura et al. | |
| 2004/0054885 A1 | 3/2004 | Bartram et al. | |
| 2004/0073792 A1 | 4/2004 | Noble et al. | |
| 2004/0111374 A1 | 6/2004 | Goldstein et al. | |
| 2005/0079866 A1 | 4/2005 | Chen et al. | |
| 2005/0182927 A1 | 8/2005 | Shatford | |
| 2005/0193211 A1 | 9/2005 | Kurose | |
| 2005/0268110 A1 | 12/2005 | Shatford | |
| 2006/0108972 A1 | 5/2006 | Araya | |
| 2006/0112269 A1 | 5/2006 | Uh et al. | |
| 2006/0265340 A1 | 11/2006 | Ziv et al. | |
| 2007/0073817 A1 | 3/2007 | Gorty | |
| 2007/0113090 A1* | 5/2007 | Villela .................. H04L 9/3247 713/170 | |
| 2007/0118891 A1 | 5/2007 | Buer | |
| 2007/0124599 A1 | 5/2007 | Morita et al. | |
| 2007/0130473 A1* | 6/2007 | Mazotas ................ H04L 63/083 713/183 | |
| 2007/0136794 A1 | 6/2007 | Chin et al. | |
| 2007/0186103 A1* | 8/2007 | Randle ..................... G06F 21/31 713/168 | |
| 2007/0204164 A1 | 8/2007 | Cattrone et al. | |
| 2008/0009345 A1 | 1/2008 | Bailey et al. | |
| 2008/0010674 A1 | 1/2008 | Lee | |
| 2008/0060061 A1 | 3/2008 | Deshpande et al. | |
| 2008/0092223 A1 | 4/2008 | Setia et al. | |
| 2008/0148351 A1* | 6/2008 | Bhatia ................. G06F 21/6218 726/2 | |
| 2008/0263652 A1* | 10/2008 | McMurtry ............ G06F 21/335 726/9 | |
| 2009/0177882 A1 | 7/2009 | Saran et al. | |
| 2009/0193510 A1 | 7/2009 | Makkinejad | |
| 2009/0193511 A1 | 7/2009 | Noe et al. | |
| 2009/0198618 A1 | 8/2009 | Chan et al. | |
| 2009/0235339 A1 | 9/2009 | Mennes et al. | |
| 2009/0240521 A1 | 9/2009 | Simons et al. | |
| 2009/0248465 A1 | 10/2009 | Recce et al. | |
| 2009/0248559 A1 | 10/2009 | Recce et al. | |
| 2009/0248560 A1 | 10/2009 | Recce et al. | |
| 2009/0260021 A1 | 10/2009 | Haenel et al. | |
| 2009/0271849 A1* | 10/2009 | Kodama ................ G06F 21/31 726/6 | |
| 2009/0292927 A1 | 11/2009 | Wenzel et al. | |
| 2009/0298581 A1 | 12/2009 | Furuhashi et al. | |
| 2010/0077457 A1 | 3/2010 | Xu et al. | |
| 2010/0079243 A1 | 4/2010 | Hamada | |
| 2010/0161973 A1 | 6/2010 | Chin et al. | |
| 2010/0174646 A1 | 7/2010 | Cole et al. | |
| 2010/0193585 A1 | 8/2010 | Salyards et al. | |
| 2010/0263044 A1 | 10/2010 | Yamada | |
| 2010/0291952 A1* | 11/2010 | Gosset ..................... H04W 4/02 455/466 | |
| 2011/0010552 A1 | 1/2011 | Hoornaert et al. | |
| 2011/0093708 A1 | 4/2011 | Buck et al. | |
| 2011/0099384 A1 | 4/2011 | Grange et al. | |
| 2011/0161232 A1 | 6/2011 | Brown | |
| 2011/0173685 A1* | 7/2011 | Chai ..................... H04L 41/0806 726/6 | |
| 2011/0225625 A1 | 9/2011 | Wolfson et al. | |
| 2011/0247058 A1 | 10/2011 | Kisters | |
| 2011/0258453 A1 | 10/2011 | Mansfield | |
| 2011/0302641 A1 | 12/2011 | Hald et al. | |
| 2012/0072980 A1 | 3/2012 | Lee | |
| 2012/0109824 A1 | 5/2012 | Takatori et al. | |
| 2012/0185697 A1 | 7/2012 | Buer | |
| 2012/0221859 A1 | 8/2012 | Marien | |
| 2012/0221860 A1 | 8/2012 | Hoornaert et al. | |
| 2012/0252412 A1* | 10/2012 | Kimura ................... H04L 63/08 455/411 | |

(56) References Cited

U.S. PATENT DOCUMENTS

| | | |
|---|---|---|
| 2012/0303181 A1 | 11/2012 | Lee |
| 2012/0323717 A1 | 12/2012 | Kirsch |
| 2013/0055348 A1 | 2/2013 | Strauss et al. |
| 2013/0067546 A1 | 3/2013 | Thavasi et al. |
| 2013/0086381 A1 | 4/2013 | Thomas et al. |
| 2013/0159716 A1 | 6/2013 | Buck et al. |
| 2013/0167196 A1* | 6/2013 | Spencer .................. H04W 8/22 726/3 |
| 2013/0198519 A1 | 8/2013 | Marien |
| 2013/0263231 A1 | 10/2013 | Lautenschlager |
| 2013/0298211 A1 | 11/2013 | M'Raihi et al. |
| 2013/0312091 A1 | 11/2013 | Merchant et al. |
| 2014/0013396 A1 | 1/2014 | Field-Eliot et al. |
| 2014/0047238 A1* | 2/2014 | Harty .................... H04L 9/3236 713/168 |
| 2014/0047522 A1 | 2/2014 | Chin et al. |
| 2014/0053257 A1 | 2/2014 | Buer |
| 2014/0068272 A1 | 3/2014 | Savtchenko et al. |
| 2014/0237236 A1* | 8/2014 | Kalinichenko ......... G06F 21/43 713/168 |
| 2014/0259116 A1* | 9/2014 | Birk ........................ G06F 21/33 726/4 |
| 2015/0193781 A1 | 7/2015 | Dave et al. |
| 2015/0310194 A1* | 10/2015 | Zhang ..................... H04L 63/10 726/9 |
| 2015/0332029 A1* | 11/2015 | Coxe ................... H04L 63/0815 726/9 |
| 2015/0334098 A1* | 11/2015 | Keys ....................... H04L 63/08 726/9 |
| 2016/0261600 A1* | 9/2016 | Bae ....................... H04L 9/3226 |

* cited by examiner

600

| SERVICE CHANNEL | TARGET AUTHENTICATION LEVEL |
|---|---|
| LIVE CHAT 601 | TARGET AUTHENTICATION LEVEL 1 610 |
| MOBILE 602 | TARGET AUTHENTICATION LEVEL 2 611 |
| ON-LINE BANKING 603 | TARGET AUTHENTICATION LEVEL 3 612 |
| ATM 604 | TARGET AUTHENTICATION LEVEL 4 613 |
| BANKING CENTER 605 | TARGET AUTHENTICATION LEVEL 5 614 |
| ⋮ | ⋮ |

FIGURE 6

SERVICE CHANNEL AUTHENTICATION TOKEN

FIELD

Aspects described herein relate to a computer system that creates and validates an authentication token that is signed with a device identification based on device attributes of the user's device.

BACKGROUND

Business services are becoming more dependent on electronic transactions in relation to traditional bricks-and-mortar transactions. This is underscored by the fact that, as of 2013, on-line banking accounted for 53% of banking transactions, compared with 14% for in-branch hank-visits. There is no question that there is a long-term shift from the role of branch locations to the importance of electronic transactions. Moreover, this trend is similar in relation to other types of businesses involved in retailing, business-to-business (BM), health, education, government, manufacturing, and the like.

Electronic transactions are often supported by one or more customer channels via the Internet or wireless telephony. In order to consummate an electronic transaction, electronic authentication of the purported customer is typically required, where a level of confidence is established through the authentication process. Authentication often begins with registration. The customer is then issued a secret (which may be referred as a token) and a credential that binds the token to a name and possibly other verified attributes. The token and credential may be used in the authentication process for subsequent electronic transactions. Hence, any enhancement to electronic authentication that increases robustness while being transparent to the customer would be beneficial to businesses that depend on electronic transactions.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses in which an authentication token is created from a plurality of attributes from a customer device. The computer system determines a device identification from a set of the attributes, signs the token, and returns it to the device. With a subsequent service request, the authentication token with device attributes is sent from the requesting device to the computer system. The computer system consequently calculates the device identification from the received attributes and compares the calculated device identification with the signed device identification of the authentication token. If there is a request with device attributes from a different device (e.g., the authentication token is stolen), the device attributes typically are not the same as the legitimate device. Consequently, the calculated device identification will not match the signed device identification.

In accordance with various aspects of the embodiments, a customer enters a service channel with or without an authentication tokens. The channel may challenge the customer with one or more default authenticators. An authentication hub consequently determines whether the customer's answers are valid and determines a resulting authentication level. The authentication hub recommends additional authenticators if the target authentication level is not reached for the serving channel.

In accordance with various aspects of the embodiments, an apparatus receives a service request over a service channel from a user device, initiates a challenge to the user device to provide authentication information based on a set of authenticators, and determines an initial level of authentication. When the initial level of authentication is not sufficient for the service channel, the apparatus generates a second challenge to the user device requesting further authentication information based on at least one additional authenticator and determines an achieved level of authentication based on the further authentication information. When the achieved level of authentication is at least as great as a target authentication level for the service channel, the apparatus continues processing the service request by the service channel.

In accordance with various aspects of the embodiments, an apparatus transfers the service request to another service channel with the authentication token obtained on the original service channel. When the target authentication level for the other service channel is greater than the achieved level of authentication, the apparatus generates a challenge to the user device requesting additional authentication information based on at least another authenticator. When the additional authentication is validated, the apparatus processes processing the service request on the other service channel.

In accordance with various aspects of the embodiments, the initial level of authentication is extracted from the authentication token.

In accordance with various aspects of the embodiments, the apparatus accesses a requested protected resource through the service channel and when the required authentication level for the protected resource is not reached, the apparatus generates a challenge message to the user device requesting additional authentication information until the required authentication level is reached.

In accordance with various aspects of the embodiments, the apparatus receives an authentication request from a user device and determines a determined device identification from a set of received device attributes. When a desired level of authentication for the user device is achieved, the apparatus generates a generated authentication token that is signed by the determined device identification and returns the generated authentication token to the user device.

In accordance with various aspects of the embodiments, the apparatus receives a service request with an authentication token and a plurality of device attributes for a protected resource from a user device. The apparatus then determines a derived device identification from some or all of the device attributes. When a signed device identification of the authentication token and the derived device identification are equal, the apparatus continues processing the service request. Otherwise, the service request is rejected.

In accordance with various aspects of the embodiments, when a signed device identification of the authentication token and the derived device identification are equal, the apparatus challenges the user device for authentication information until a degree of authentication is achieved.

In accordance with various aspects of the embodiments, the apparatus determines a changed device identification from a different device attribute set for the user device. The apparatus signs a changed authentication token with the changed device identification and returns the changed authentication token to the user device.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which:

FIG. 6 shows an example of mapping different service channels to corresponding target authentication levels according to one or more illustrative embodiments.

DETAILED DESCRIPTION

Figure 1:
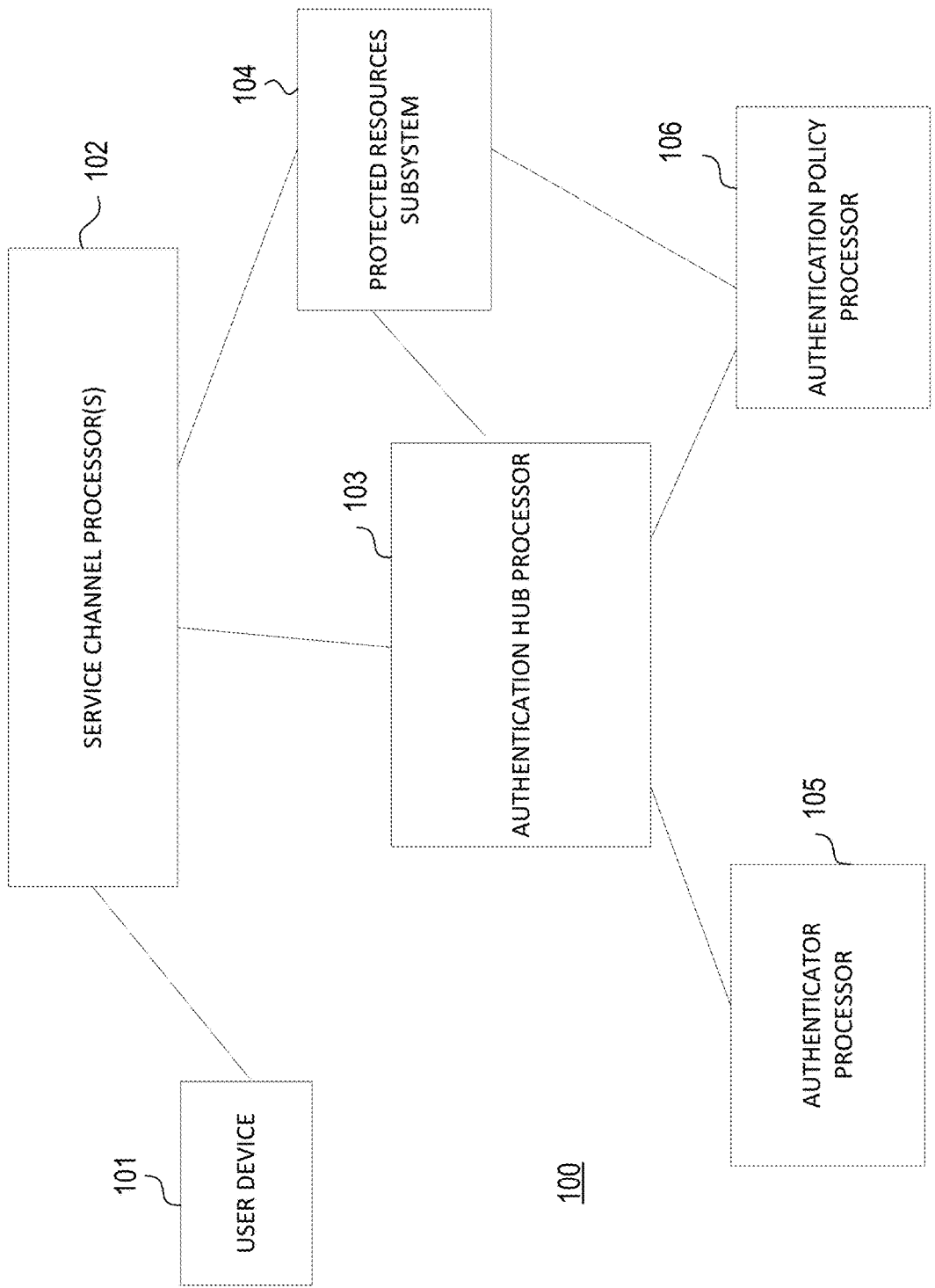
FIG. 1 shows a system for supporting service channels using different levels of authentication according to one or more aspects of the present disclosure.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Within a typical authenticated website, when a customer successfully authenticates into the website, the website generates an authentication token for the customer's session. This authentication token bears the proof that the customer has been successfully authenticated within this session. Any subsequent requests to the website for protected resources may require that the token be passed back so that the website application can validate that the customer is authenticated before serving the request. This authentication token is typically carried around through the browser cookies. With traditional approaches, authenticated websites use authentication tokens as the sole proof that customers are authenticated. One significant disadvantage of this traditional approach is that once the token is stolen, anybody may be able to re-play customer's session from any other device before the token expires.

In accordance with various aspects of the embodiments, a computer system receives a request to create an authentication token with a plurality of attributes from a customer device. The computer system determines a device identification from a set of the attributes, signs the token, and returns it to the device. With a subsequent service request, the authentication token with device attributes is sent from the requesting device to the computer system. The computer system consequently calculates the device identification from the received attributes and compares the calculated device identification with the signed device identification from the authentication token. If the token is subsequently stolen with a different device, the device attributes are typically not the same as the legitimate device. Consequently, the calculated device identification will not match the signed device identification.

In accordance with various aspects of the embodiments, a customer enters a service channel with or without an authentication tokens. The channel may challenge the customer with one or more default authenticators. An authentication hub consequently determines whether the customer's answers are valid and determines a resulting authentication level. The authentication hub recommends additional authenticators if target authentication level is not reached for the serving channel.

In accordance with various aspects of the embodiments, authentication hub may support different types of businesses, including financial, retail, e-commerce, educational, manufacturing, and so forth.

The steps that follow in FIGS. 1 and 4-12 may be implemented by one or more of the components in FIGS. 2 and 3 and/or other components, including other computing devices as will be discussed.

FIG. 1 shows system 100 for supporting service channels that may use different levels of authentication according to one or more aspects of the present disclosure. For example, service (customer) channels may include self-service channels and/or associate-assisted channels. Self-service channels may include on-line banking (OLB), mobile, automated teller machine (ATM), interactive voice recognition (IVR), social (personal and professional networks), and point of service (POS). Associate-assisted channels may include live chat, banking center, and contact center.

Computer system 100 may include a plurality of processors such as service channel processors 102 that provides interfacing to user device 101 via one of a plurality of service channels and authentication processor hub 103 that manages authentication of user device 101 through authenticator processor 105 and authentication processor 106 as will be further discussed. If authentication processor hub 105 determines that an adequate level of authentication has been achieved, user device 101 is able to access one or more protected resources via computer subsystem 104 in accordance with the user's service request, where a protected resource corresponds to a particular customer activity or capability supported through the service channel. With banking services, for example, protected resources may include money transfer, customer maintenance, and account inquiries. Different protected resources may have different required levels of authentication. For example, a money transfer may require a higher level of authentication than an account inquiry.

While FIG. 1 depicts a plurality of processors 102-106, some or all of the associated functions may be incorporated into an integrated computer device.

User device 101 may assume different types of communication devices such as a wireless device (e.g., smart phone) or wireline telephony device (e.g., traditional telephone). Also, some embodiments may support the functionality of user device 101 within a service channel interface so that the user can directly communicate via a corresponding service channel, e.g., an automated teller machine (ATM) or automated teller assisted apparatus.

Authentication processor hub 103 may manage some or all of authenticators to authenticate a user and to determine the corresponding level of authentication. With some embodiments, an authenticator denotes confirmation of objects (e.g., customers and devices), on-line identification/password, one-time password (OTP), driver license, card verification value, social security number, device attributes, security questions/answers, and so forth. Each authenticator typically has a corresponding authenticator strength that is indicative of the degree of strength for uniquely and securely confirming the customer or device's identity and may be represented by a numerical value. In order to verify an authenticator, authentication processor 105 may validate the authenticator based on corresponding authentication information provided by authentication processor hub 103.

The authentication level is indicative of how well the customer has been authenticated. For example, a customer who is authenticated through both on-line identification/password and one-time password (OTP) typically has a higher authentication level than the customer who is just authenticated through a plain on-line identification/password. With some embodiments, protected resources require that a customer attain at least a target authentication level in order to access the protected resource. As will be discussed, an authentication token may contain an authentication level; however, the authentication level may be increased (e.g., through an authentication step-up process as shown in flow chart 500) if additional authenticators can be validated for the customer.

System 100 may support an authentication token that is used during the authentication processes, e.g., processes 500 (customer authentication and authentication step up), 800 (channel/call transfer), 1000 (signing an authentication token), and 1200 (protecting authentication token with signature based on persistent device identification) as will be discussed with FIGS. 5, 8, 10, and 12, respectively.

An authentication token may be an encrypted security token that carries the proof that customer is identified and authenticated. An authentication token may include a customer identifier, authentication level, session identification, a list of passed/failed authenticators, expiration time and other custom attributes. An authentication token can be shared by all of the service channels to securely and uniquely identify the customer and access corresponding protected resources.

As shown in FIG. 1, authentication policy processor 105 creates, updates, and/or validates an authentication token as will be discussed with FIGS. 9-12.

Figure 2:
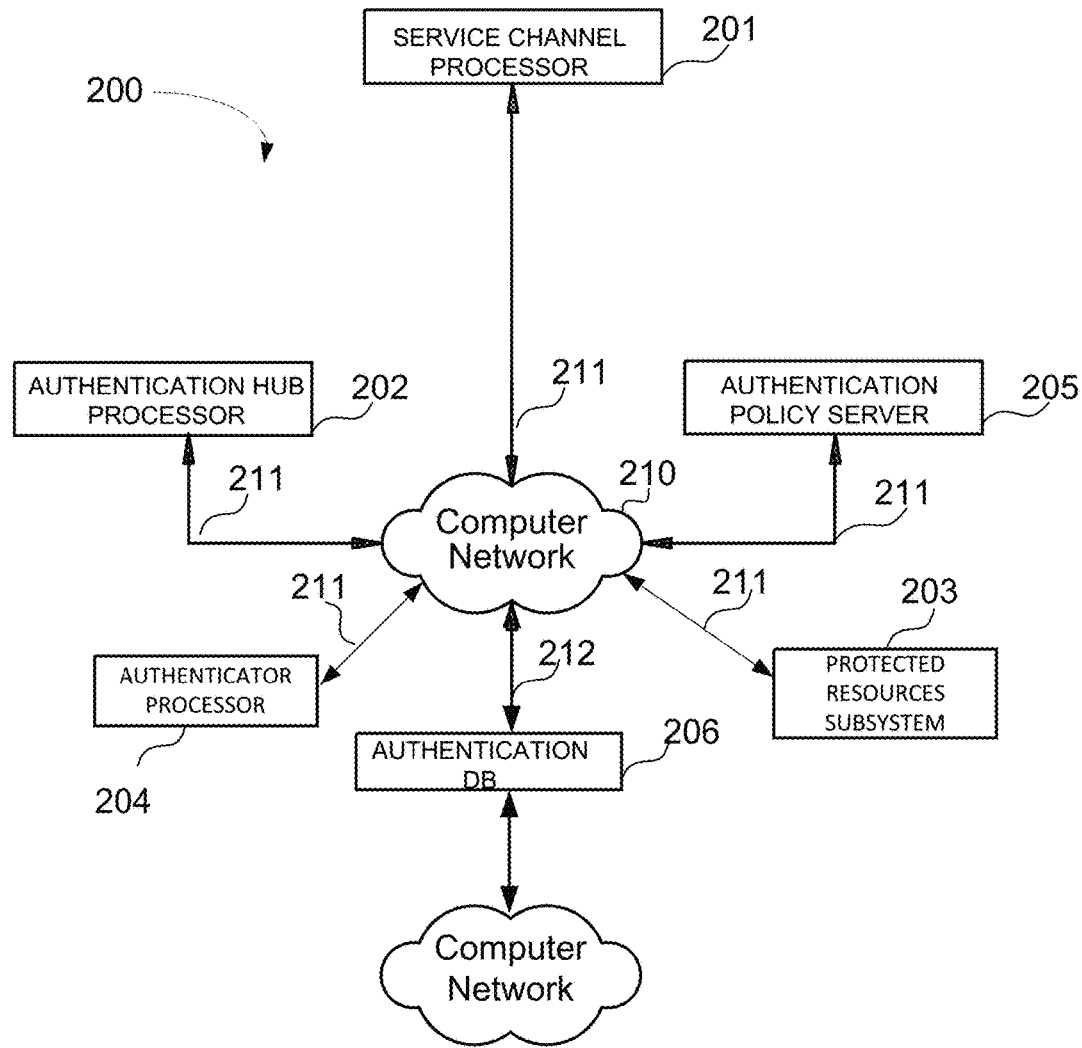
FIG. 2 shows an illustrative system for implementing exemplary embodiments according to one or more aspects of the present disclosure.

FIG. 2 shows a plurality of processors for implementing exemplary embodiments of the system shown in FIG. 1 according to one or more aspects of the present disclosure. System 200 may include one or more processors 201-205 corresponding to service channel processor 102, authentication hub processor 103, protected resources subsystem 104, authenticator processor 105, and authentication policy processor 106, respectively, as shown in FIG. 1. Processors 201-205 may be local or remote, and may be connected by one of communications links 211 to computer network 210 that is linked via communications link 212 to authentication database 206.

Computer network 210 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 211 may be any communications links suitable for communicating between processors 201-205, such as network links, dial-up links, wireless links, and hard-wired links.

Figure 3:
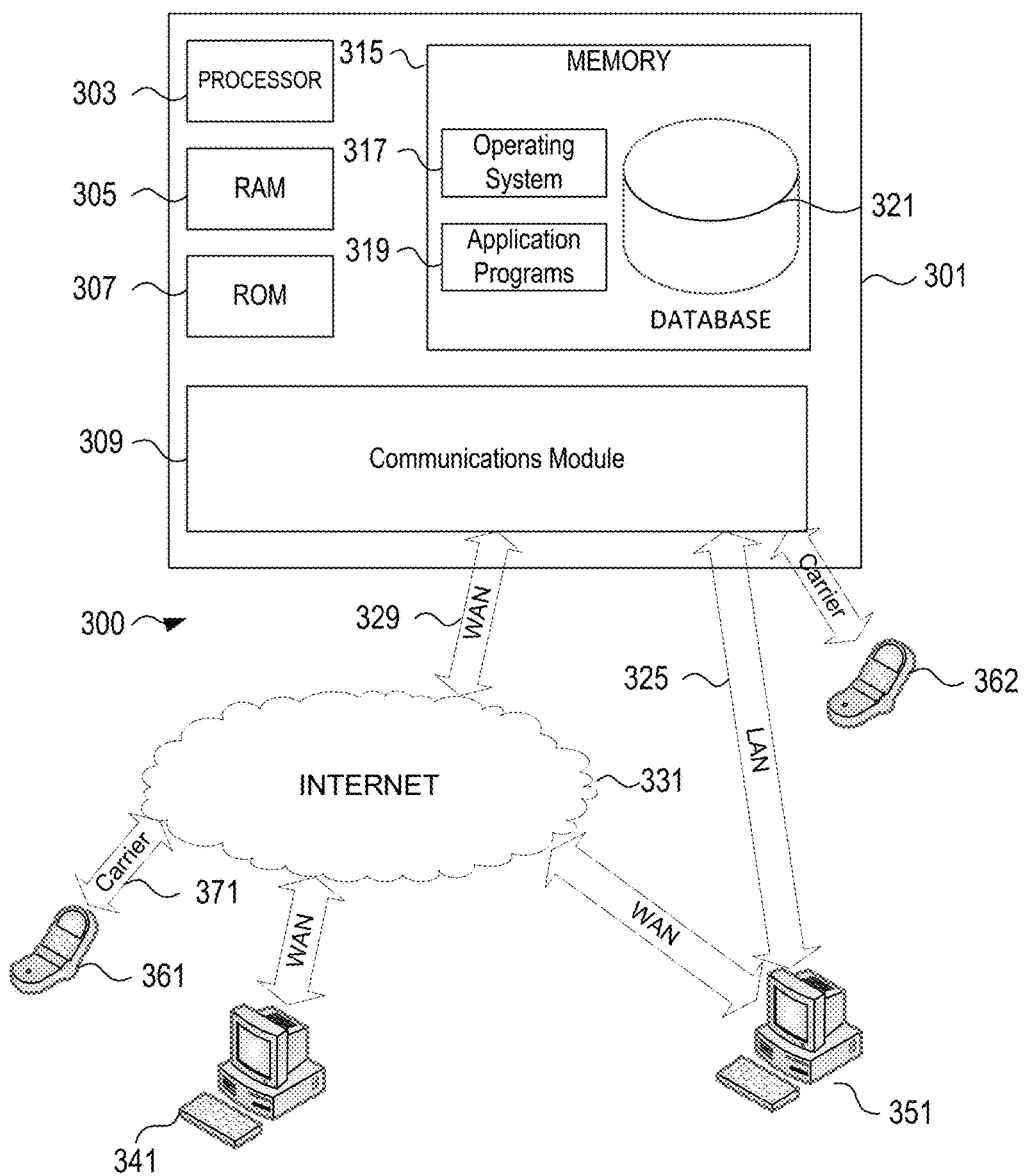
FIG. 3 illustrates an example of a suitable computing system environment that may be used according to one or more illustrative embodiments.

FIG. 3 illustrates an example of a suitable computing system environment 300 that may be used according to one or more illustrative embodiments. For example, computing system environment 300 may support any of processors 201-205, as shown in FIG. 2, performing processes 500, 800, 1000, and 1200 as shown in FIGS. 5, 8, 10, and 12, respectively, to authenticate a customer. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 3, the computing system environment 300 may include a computing device 301 wherein the processes discussed herein may be implemented. The computing device 301 may have a processor 303 for controlling overall operation of the computing device 301 and its associated components, including random-access memory (RAM) 305, read-only memory (ROM) 307, communications module 309, and memory 315. Computing device 301 typically includes a variety of computer readable media. Computer readable media may be any available media that may be accessed by computing device 301 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 301.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 300 may also include optical scanners (not shown). Exemplary usages include scanning and converting paper documents, e.g., correspondence and receipts to digital files.

Although not shown, RAM 305 may include one or more are applications representing the application data stored in RAM 305 while the computing device is on and corresponding software applications (e.g., software tasks), are running on the computing device 301.

Communications module 309 may include a microphone, keypad, touch screen, and/or stylus through which a user of computing device 301 may provide input, and may also include one or more of a speaker for providing audio output and a video display device for providing textual, audiovisual and/or graphical output.

Software may be stored within memory 315 and/or storage to provide instructions to processor 303 for enabling computing device 301 to perform various functions. For example, memory 315 may store software used by the computing device 301, such as an operating system 317, application programs 319, and an associated database 321. Also, some or all of the computer executable instructions for computing device 301 may be embodied in hardware or firmware.

Computing device 301 may operate in a networked environment supporting connections to one or more remote computing devices, such as computing devices 341, 351, and 361. The computing devices 341, 351, and 361 may be personal computing devices or servers that include many or all of the elements described above relative to the computing device 301. Computing device 361 may be a mobile device communicating over wireless carrier channel 371.

The network connections depicted in FIG. 3 include a local area network (LAN) 325 and a wide area network (WAN) 329, but may also include other networks. When used in a LAN networking environment, computing device 301 may be connected to the LAN 325 through a network interface or adapter in the communications module 309. When used in a WAN networking environment, the computing device 301 may include a modem in the communications module 309 or other means for establishing communications over the WAN 329, such as the Internet 331 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 319 used by the computing device 301, according to an illustrative embodiment, may include computer executable instructions for invoking user functionality related to communication including, for example, email, short message service (SMS), and voice input and speech recognition applications.

Figure 4:
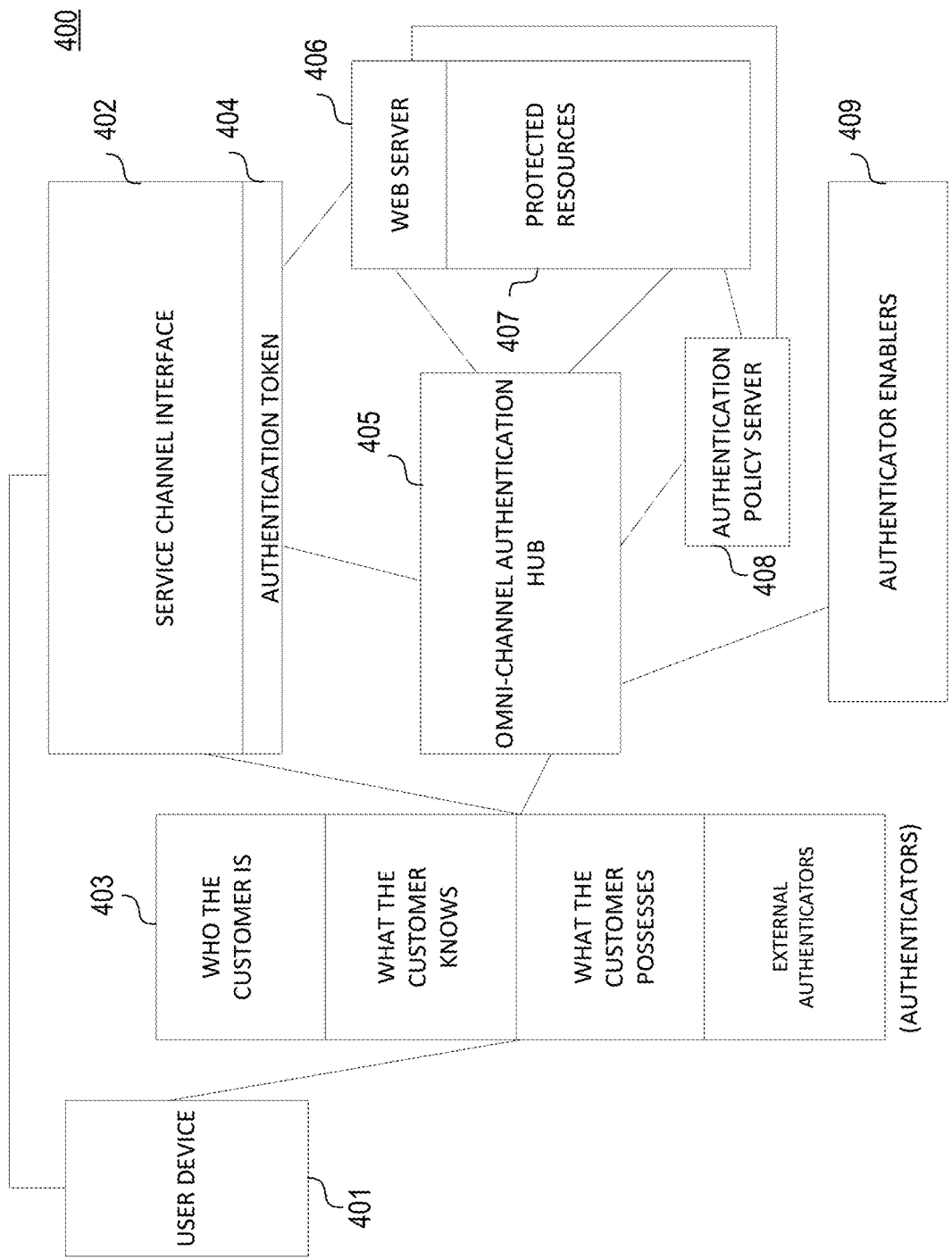
FIG. 4 shows a scenario for providing a service channel that may be used according to one or more illustrative embodiments.

FIG. 4 depicts scenario 400 for providing a service channel through system 100 as shown in FIG. 1. In the scenario, a customer via user device 401 sends a service request with or without authentication token 404 to service channel interface 402 (which may be supported by service channel processor 102 as shown in FIG. 1).

In order to authenticate a user, user device 401 sends authentication information based on authenticators recommended by authentication hub 405 in order to attain the required level of authentication for the accessed service channel as well as needed protected resources 407.

Authentication hub 405 may support omni-channels, where a user has access to virtual channel capabilities from a physical location and has an experience initiated in one channel that is seamlessly transferable to another one. A user may hop from one channel to channel depending on the task at hand, with the expectation that all relevant information may be available through all channels.

With some embodiments, authentication hub 405 may be the primary provider of the customer authentication for different service channels (e.g., desktop, mobile, or contact center) in different formats (e.g., HTML or XML) through multiple authentication mechanisms (e.g., password, identification, biometrics, and so forth). Authentication hub 405 may also be responsible for credential management, secure key management, soft tokens, device registration, authentication level management, and the like.

Authentication information for the recommended authenticators is then validated by authenticator enablers 409. If properly validated, the authentication level is adjusted to the corresponding authenticator level.

A plurality of authenticators 403 may be based on different categories of authentication information as illustrated by:

Who the customer is: facial and/or voice characteristics; fingerprint characteristics of the user What the customer knows: on-line password, PIN, security questions/answers, knowledge about previous activity for customer's account, identification based on external source such as a credit rating service What the customer possesses: PC, tablet, ATM card, credit card, OTP card External authenticators: single sign-on in which a customer's authentication token is trusted across multiple systems Authentication token 404 may include an authentication level that was established when the token was created or updated by authentication policy server 408 based on authentication information obtained at that time. If so, determining the authentication level for user device 401 can be based on the contained value in token 404 as well as additional authenticators as validated by authenticator enablers 409. If the contained value is not sufficient for required protected resources 407 associated with the service request, web server 406 (which interfaces with protected resources 407) may inform authentication hub 405 about the need to increase the authentication level (which may be referred as authentication step-up). If so, authentication hub 405 recommends one or more authenticators so that user device 401 can be queried through service channel interface 402 for additional authentication information that can be verified by authenticator enablers 409. If web server 406 deems that the authentication level is sufficient, the service request if forwarded to protected resources 407 for further processing.

Authenticator enablers 409 validate authentication information received from user device 401 via authentication hub 405. Embodiment of the disclosure may support a plurality of enablers including a primary authentication database, secondary authentication database, one or more biometrics analyzers, know-based verifiers, and/or identity verifiers. For example, the primary authentication database may store customer information about on-line identifications/passwords, telephone identifications, ATM PIN's, account numbers, social security numbers, challenge questions/answers, and the like. The secondary database may further include customer information about facial/voice identifications, risk/fraud analysis information, and the like.

As previously discussed, protected resources 407 support customer capabilities that are associated with the requested service. For example, with financial services, protected resources 407 may support an account inquiry and a money transfer. A transfer is typically more critical than an inquiry; consequently, the transfer capability has a higher authentication level than the inquiry capability. If protected resources 407 determines that a higher level of authentication is required than what is indicated by token 404, protected resources 407 may initiate an authentication step-up with authentication hub 405, similar to the step-up initiation by web server 406 as previously discussed.

When authentication token 404 is available (e.g., if provided with the service request), authentication policy server 408 validates token 404 and verifies the contained authentication level. Moreover, authentication policy server 408 may create or update an authentication token 404 when requested by authentication hub 405 with the proper authentication level in accordance with validated authenticators.

Figure 5:
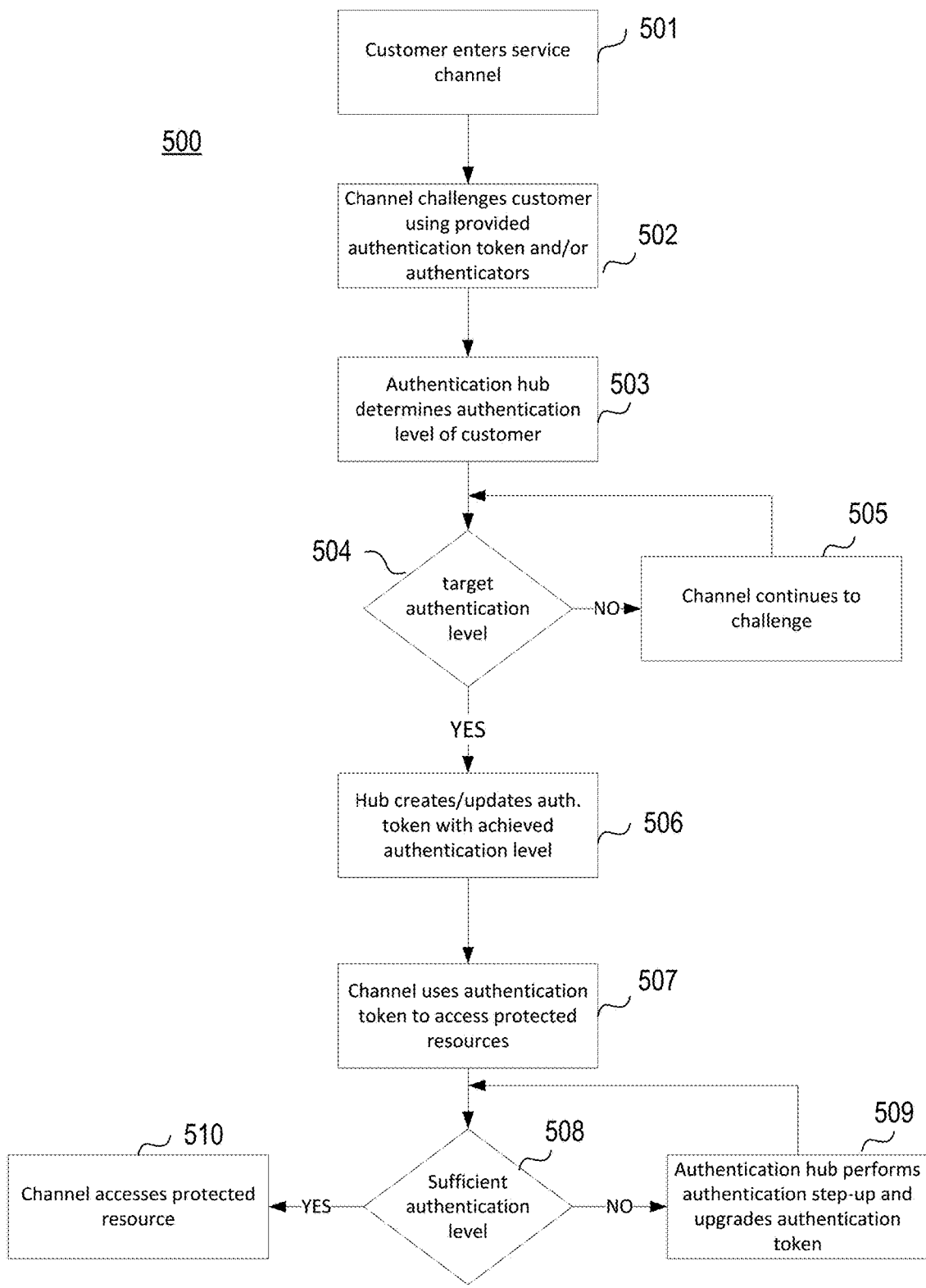
FIG. 5 shows a flow chart for supporting customer authentication and authentication step-up according to one or more aspects of the present disclosure.

FIG. 5 shows flow chart 500 that may be performed by authentication hub 405 for supporting customer authentication and authentication step-up according to one or more aspects of the present disclosure. Authentication step-up may be invoked when the initial authentication level is lower than the required level to access a protected resource. For example, the initial authentication level may be determined by the value of the authentication level contained in the authentication token received from user device 401. If that is the case, the protected resource routes the customer back to authentication hub 405 to re-authenticate the customer with an authenticator having a higher authentication strength as characterized by a numerical value. For example, on-line identification/password, one-time password (OTP) via e-mail, OTP via SMS, and knowledge-based verification/driver license may have authentication levels of 300, 400, 410, and 250, respectively. An authentication step-up framework may be leveraged to determine whether a customer already has a sufficient authentication level for protected resources, in which authentication hub recommends an appropriate authenticator to step up from the current authentication level to the target authentication level. With the above example, if the authentication level for the authentication is 300, then either OTP via e-mail or SMS may be validated in order to step up the authentication level.

Referring to FIG. 5, a customer enters a selected service channel when user device 401 sends a service request with a previously created authentication token 404 at block 501. Authentication hub 405 authenticates the customer and may challenge the customer for recommended authenticators at block 502 with respect to the selected service channel. The recommended authenticators are used to increase the authentication level with respect to the contained authentication level in the authentication token at block 503. If needed, the service channel continues to challenge user device 401 with one or more additional authenticators at block 505 until the target authentication level is reached for the selected service channel at block 504. For example, as shown in FIG. 6, different service channels 601-605 may have different target authentication levels 610-614. Embodiments may include additional authentication levels (not explicitly shown in FIG. 6) including an interactive voice response (IVR) system and/or call center, and so forth.

At block 506, authentication hub 405 creates or updates authentication token 404 with the attained authentication level from blocks 504 and 505. The selected service channel then uses the attained authentication level to access one or more protected resources as requested by the service request from user device 401 at block 507. While the accessed protected resources may have the same target level of authentication as the selected service channel, some of the protected resources may have different levels. For example, the customer may request an account inquiry through the customer's desktop computer, requiring a medium level of authentication. However, if the customer were requesting a money transfer, the required level of authentication may be higher since money may be transferred from the customer's account for the hypothetical example. With some embodiments, a mapping between the protected resources and required authentication levels may be created in a similar fashion as with the service channels as shown in FIG. 6.

If the target authentication level from block 507 is sufficient at block 508, the requested protected resources are accessed. If that is not the case, authentication hub 405 may attempt to increase the authentication level of customer device 401 (referred as authentication step-up) at block 510 by initiating challenging the customer device 401 with additional authenticators (e.g., biometric information and/or challenge questions/answers). If the response is determined to be correct, the authentication level is increased, and authentication token 404 may be updated.

Figure 7:
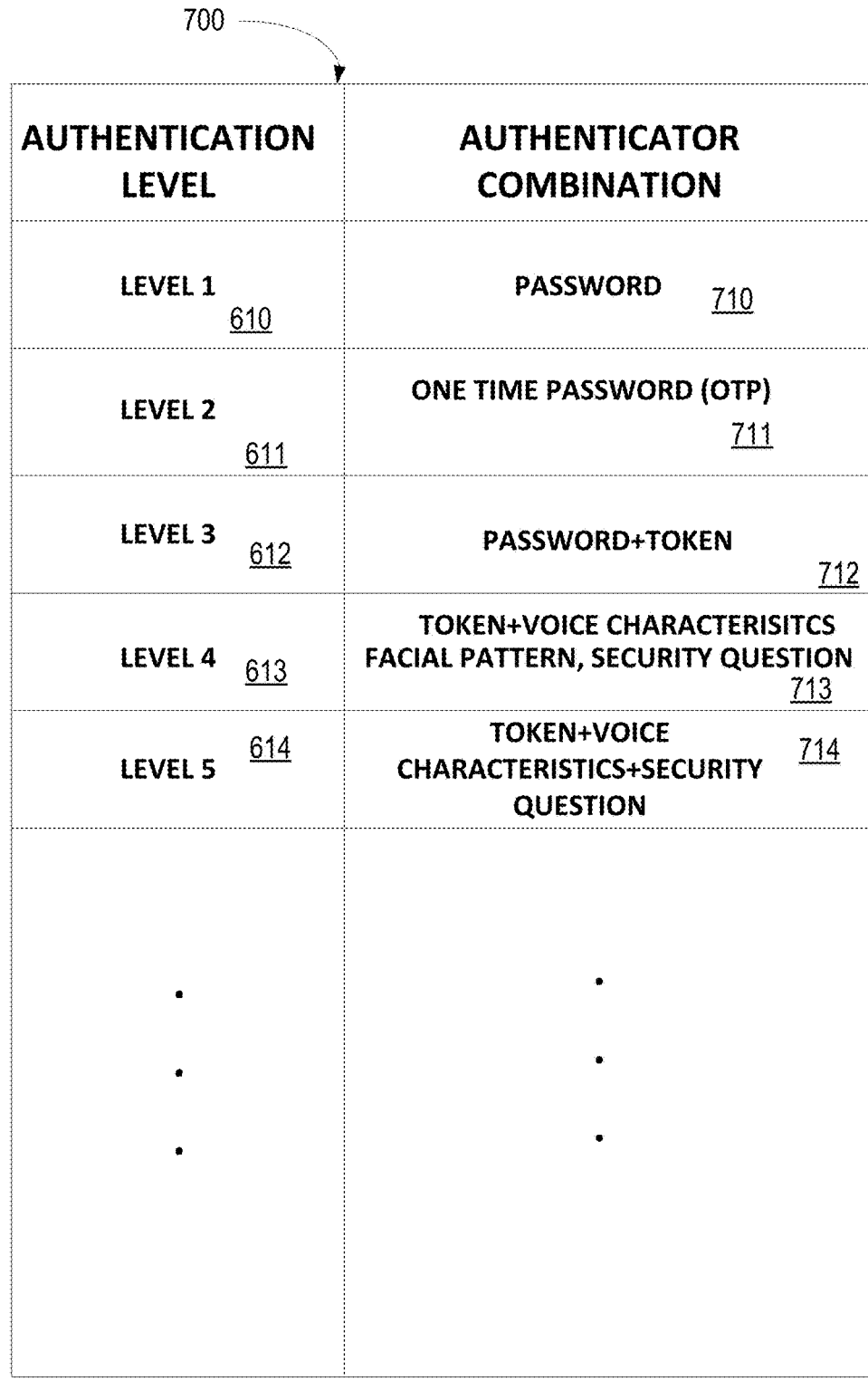
FIG. 7 shows an example of mapping different authentication levels to combinations of authenticators according to one or more aspects of the present disclosure.

FIG. 7 shows exemplary mapping 700 of different authentication levels 610-614 to combinations of authenticators according to one or more aspects of the present disclosure. Each combination of authenticators corresponds to one or more authenticators. For example, levels 610 and 611 are mapped to single authenticators, while levels 612-614 are each mapped to a plurality of authenticators. The assigned level of authentication for a combination may be greater than the level for each of authenticators in the combination. The approach is predicated on an assumption that each authenticator is independent of the other so that properly responding to the combination is more difficult than responding to an individual authenticator. With some embodiments, if a user response to a presented authenticator is deemed incorrect by authentication hub 405, additional authentication requirements may be initiated. For example, one or more alternative authenticators may be presented to the user, and if correctly answered, an assigned level of authentication is obtained.

Figure 8:
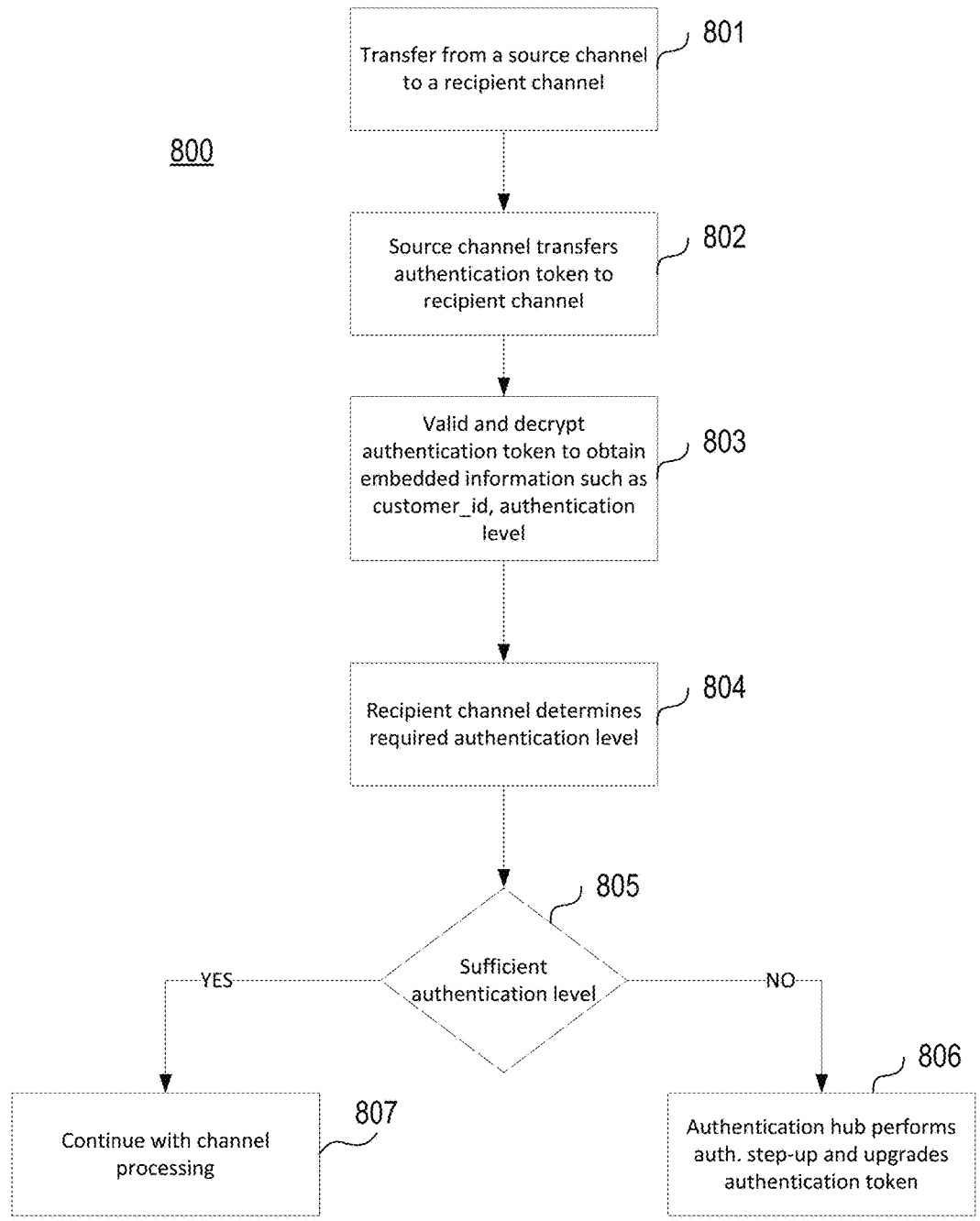
FIG. 8 shows a flow chart for transferring a service request from one service channel to another service channel according to one or more aspects of the present disclosure.

FIG. 8 shows flow chart 800 for transferring a service request from one service channel to another service channel according to one or more aspects of the present disclosure. For example, a customer may initiate a service request on the customer's desktop, and may subsequently wish to move to the customer's mobile device in order to have the needed mobility to access paper account records. As another example, a customer may wish to transfer from the customer's mobile device to an ATM when the customer accesses the ATM. When the customer is transferred from one service channel to another service channel or from one agent to another agent in the same channel, the source channel or agent transfers the authentication token to the recipient channel or agent along with other required data. The recipient channel or agent may use a token plugin, authentication token software development kit (SDK), or remote authentication hub service to validate and/or decrypt the authentication token, and retrieve parameters, e.g., customer id, authentication, and the like. The recipient channel or agent determines the next step based on the current authentication level and so forth.

Referring to FIG. 8, a customer is transferred from a first service channel (source channel) to a second service channel (recipient channel) at block 801. Consequently, the source channel forwards authentication token 404 to the recipient channel at block 802. With this approach, the token is portable across different service channels. The recipient channel, through authentication hub 405, validates and decrypts authentication token 404 to obtain embedded information such as the customer identification, authentication level, and the like at block 803.

As previously discussed, different service channels may require different authentication levels as exemplified with FIG. 6. The recipient channel determines the required authentication level at block 804 and initiates an authentication level step-up at blocks 805 and 806 if the authentication level needs to be increased. If so, authentication hub 405 recommends further authenticators. If user device 401 provides the appropriate responses, the authentication level is increased. When sufficient authentication level has been established, processing of the customer's service request continues at the recipient channel at block 807.

Figure 9:
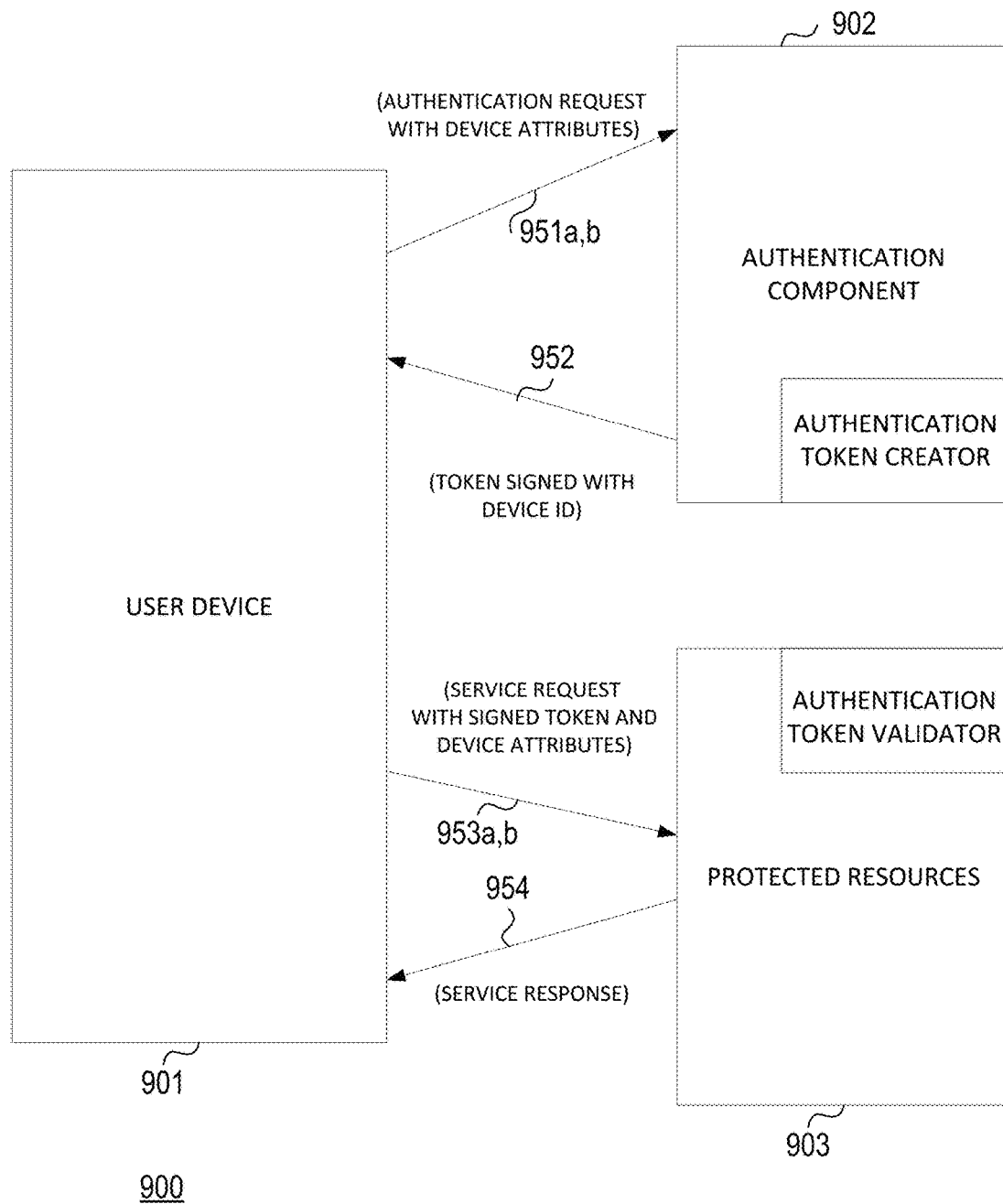
FIG. 9 shows a scenario for providing an authentication token and for validating the authentication token that may be used according to one or more illustrative embodiments.

FIG. 9 shows scenario 900 for providing an authentication token and for validating the authentication token that may be used according to one or more illustrative embodiments. Within authenticated system 100 (as shown in FIG. 1), when customer successfully authenticates into the system, the system generates an authentication token for that customer's session. The authentication token bears the proof that the customer has been successfully authenticated within this session. Any subsequent requests to the system for protected resources may require that the token be passed back so that the service application can validate that the customer is indeed authenticated before serving the request. For example, he authentication token may be carried around through the browser cookies. Authenticated systems may use the authentication token as the sole proof that customer is authenticated. With traditional systems, one significant disadvantage of this approach is that once the token is stolen, anybody will be able to re-play customer's session from any other device before the token expires. An aspect of the embodiments mitigates this security deficiency by signing the authentication token with attributes obtained from the user device.

Referring to FIG. 9, user device 901 sends authentication request 951a with device attributes 951b to authentication component 902 that supports authentication token creation. Authentication component 902 determines the device identification based on a set of attributes from some or all of the obtained attributes, where the device attributes may be collectively referred as the device fingerprint. Authentication token 952 is then signed with the device identification and returned to user device 901.

The approach is that if a different device subsequently attempts to access a service channel with authentication token 952, the attempt will be rejected. With the scenario shown in FIG. 9, user device 901 subsequently sends service request 953a with device attributes 953b to protected resources 903. If a different device sends token 952 (such as if token 952 was stolen) the derived device identification will not match the signed device identification used for encrypting token 952. When a match occurs, protected resources 903 provide the requested services with service response 954.

Figure 10:
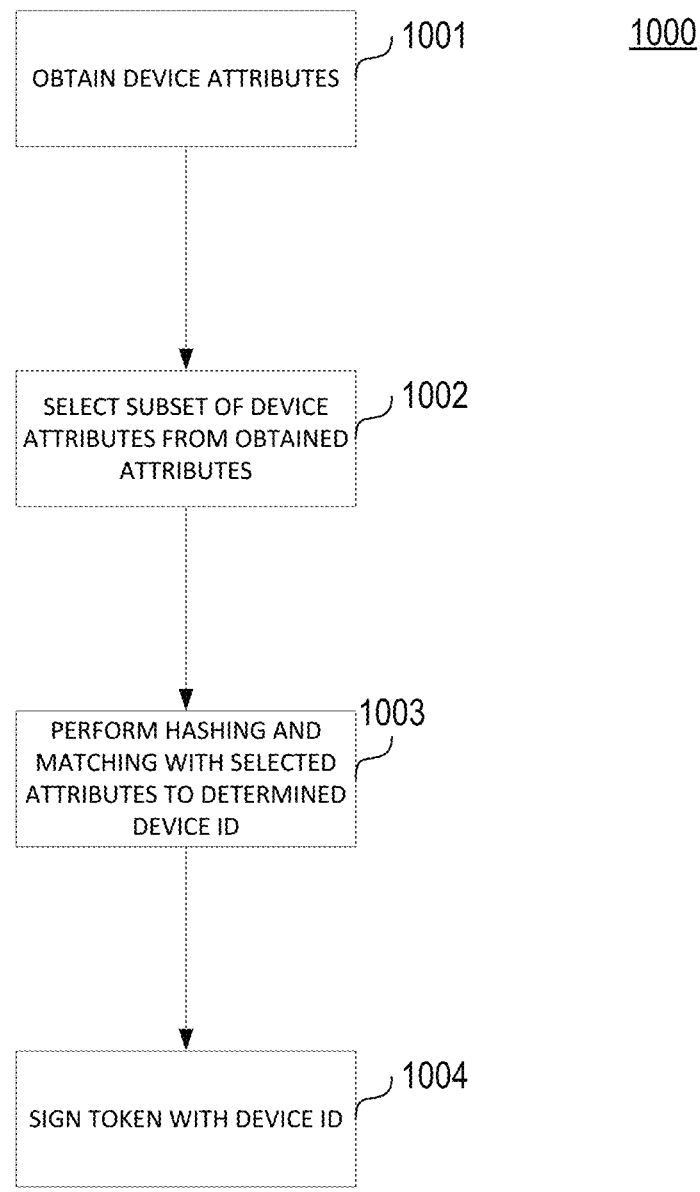
FIG. 10 shows a flow chart for signing a created authentication token according to one or more aspects of the present disclosure.

FIG. 10 shows flow chart 1000 for signing a created authentication token according to one or more aspects of the present disclosure. With some embodiments, authentication hub 405 initiates the creation of authentication token 404 by authentication policy server 408, where the token is signed by the device identification as determined by process 1000.

At block 1001, process 1000 obtains device attributes from user device 401. For example, attributes may include but not limited to: operating system details, browser or mobile device type, browser version, browser plugin, browser visiting history, browser fonts, browser cookies, applications installed in the mobile device, GPS location, and so forth. Device attributes may also include physical attributes such as characteristics of integrated circuit components and memory configurations as well as computer settings of user device 401.

At block 1002, some of all of the obtained device attributes are selected and are processed through a hash function at block 1003 to form the device identification. With some embodiments, multiple raw device attributes are captured. Each individual device attribute may be used to match against the corresponding values in device fingerprint that was previously captured and persisted in a database such as database 206 as shown in FIG. 2. Device attributes may include browser header information and/or physical characteristics of user device 401. One of functions of block 1002 is to obtain a set of attributes to obtain an essentially unique device identification for the user device with respect to other user devices. Moreover, block 1002 may change the selection of the device attributes to provide greater security as long as the uniqueness is preserved.

The device identification from block 1004 is then used to sign authentication token 404. With some embodiments, the device identification is one of the attributes embedded inside authentication token 404 as a name value pair. Token 404 may be encrypted and decrypted in accordance with the Advanced Encryption Standard (AES). After token decryption, the device identification inside authentication token 404 may be verified against the newly-derived device identification. If they match, token 404 is valid.

The following is an example that exemplifies process 1000.

Raw device attributes:

```
LANGUAGE_BROWSER=en-us&LANGUAGE_USER=en-
us&JAVA=1&DISPLAY=24|1280|800|770&SUPPRESSED=false&COOKIE=1&LANG
UAGE_SYSTEM=en-
us&SOFTWARE=abk%3D6,1,7601,17514|wnt%3D6,1,7601,18103|dht%3D9,0,8112,16
421|ie5%3D9,0,8112,16421|ieh%3D9,0,8112,16421|iee%3D6,1,7601,16978|wmp%3D12
,0,7601,17514|obp%3D9,0,8112,16421|oex%3D6,1,7601,17514|mvm%3D5,0,5000,0&L
ANGUAGE=lang%3Den-us|syslang%3Den-us|userlang%3Den-
us&BROWSER=mozilla/5.0+(compatible;+msie+9.0;+windows+nt+6.1;+trident/5.0;+sl
cc2;+.net+clr+2.0.50727;+.net+clr+3.5.30729;+.net+clr+3.0.30729;+media+center+pc+6.
0;+.net4.0c;+media+center+pc+5.0;+slcc1;+tablet+pc+2.0;+mcafee)|5.0+(compatible;+M
SIE+9.0;+Windows+NT+6.1;+Trident/5.0;+SLCC2;+.NET+CLR+2.0.50727;+.NET+CL
R+3.5.30729;+.NET+CLR+3.0.30729;+Media+Center+PC+6.0;+.NET4.0C;+Media+Ce
nter+PC+5.0;+SLCC1;+Tablet+PC+2.0;+McAfee)|Win32|0|x86|en-
us|16483&version=1&TIMEZONE=-8
``` where information is contained in the browser header, "&" denotes a bitwise operator, and "|" denotes a pipe delimiter.

Process 1000 performs hashing and matching operations to obtain a device identification=57b1828efe017fe-6e228f0bed18e8eb96c93f07.

Figure 11:
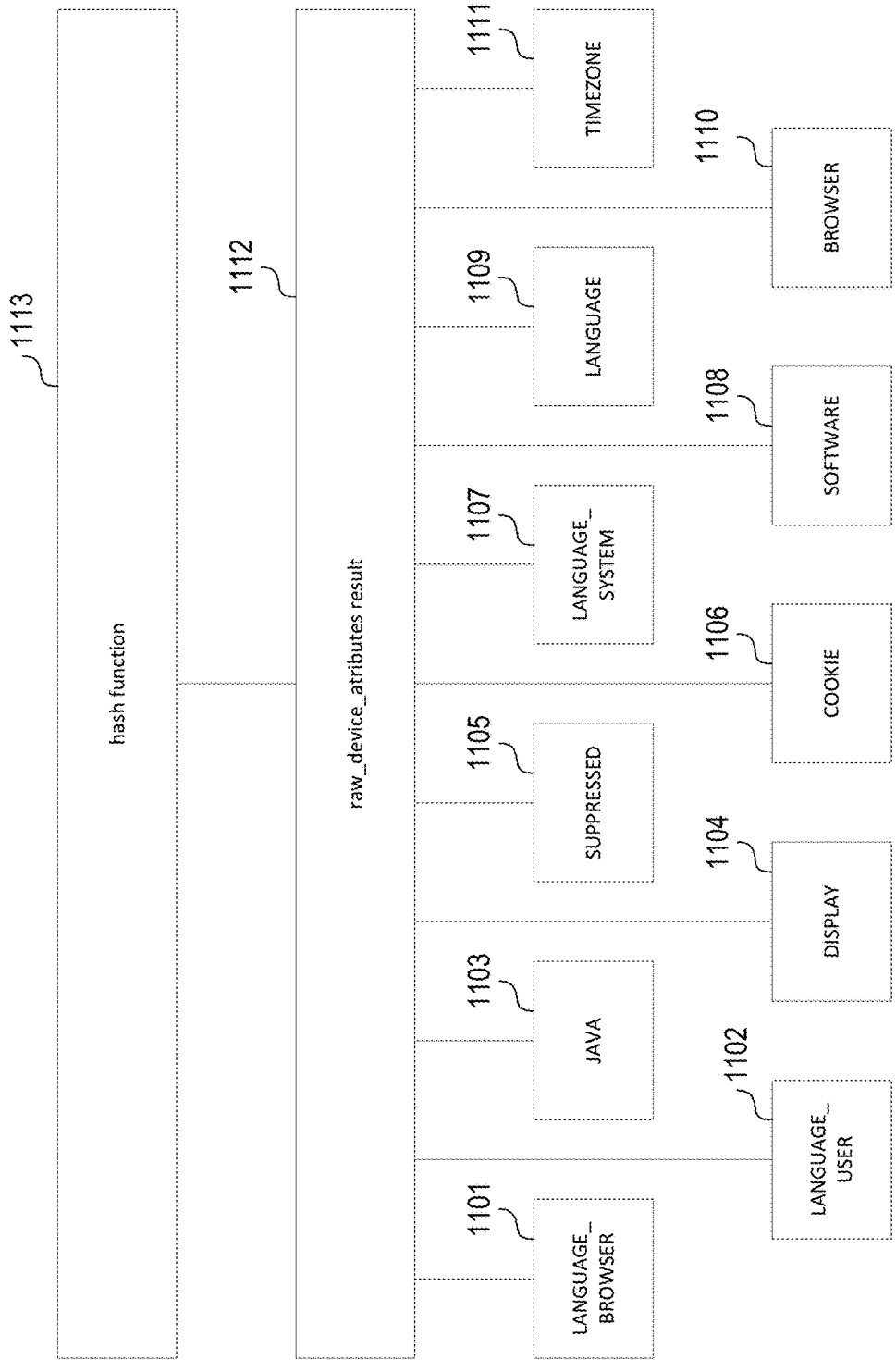
FIG. 11 shows an example for determining a device identification according to one or more aspects of the present disclosure.

FIG. 11 illustrates the determination of a device identification in accordance with the above example. Browser settings 1101-1111 are combined to obtain raw_device_attributes result 1112. However, with some embodiments, additional or different browser settings may be combined. Moreover, physical characteristics of device 401 may be combined with browser settings 1101-1111 for obtaining result 1112. Raw_device_attributes result 1112 is then presented to hash function 1113 to obtain the device identification. With some embodiments, other parameters may be included. e.g., the session identification.

Figure 12:
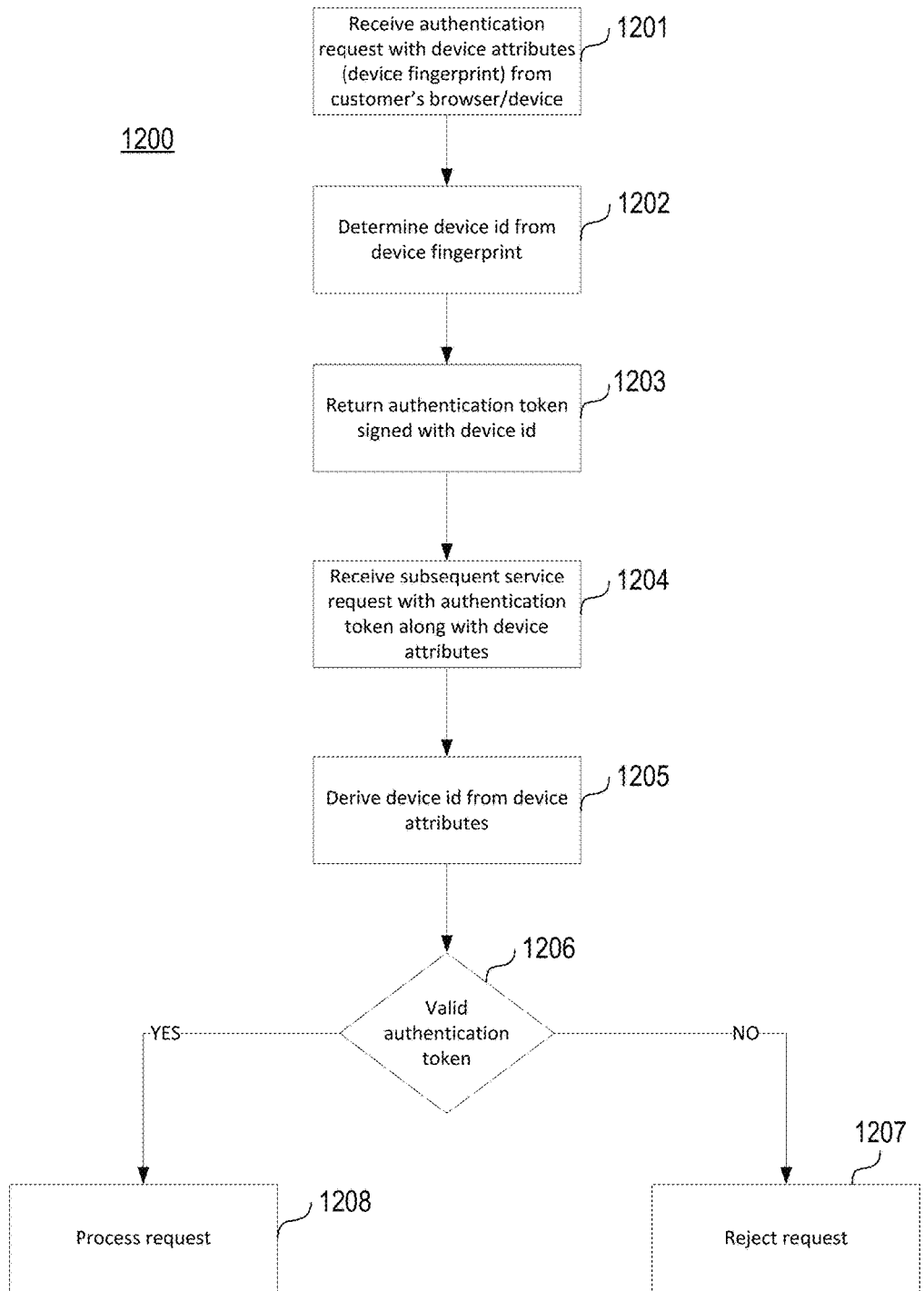
FIG. 12 shows a flow chart for protecting an authentication token with a signature based on a device identification according to one or more aspects of the present disclosure.

FIG. 12 shows flow chart 1200 for protecting a signed authentication token based on a persistent device identification and parallels the scenario previously discussed with FIG. 9. Blocks 1201-1203 correspond to the creation of an authentication token as discussed with FIG. 10. Upon submitting authentication request, system 100 may leverage a client-side software development kit (SDK) or a dynamic computer programming language approach to collect all necessary device attributes. System 100 submits the authentication request with customer's input along with device attributes and authenticates the customer based on the authentication credentials provided by the customer through device 101. System 100 may perform an algorithm to derive a persistent device identification based on some or all of the obtained device attributes at block 1202 and create and return an authentication token signed with device identification to user device 101 at block 1203 if the authentication is successful.

With a subsequent service request for protected resources at block 1204, customer's browser/device 101 sends the authentication token back along with device attributes. Process 1200 again derives the device identification based on devices attributes received with the service request at block 1205.

With this approach, the device identification is unique for a particular device, so if the service request is sent from a different device other than the device from which the authentication token was created, validation of the authentication token will fail at block 1206, and the service request will be rejected at block 1207. In such a case, a notification may be generated by system 100 that is indicative of the failure. With some embodiments, the customer may be notified of the failure and instructed on how to further protect his/her accounts and information. Otherwise, the service request is processed as previously discussed.

Embodiments of the disclosure may include forms of computer-readable media. Computer-readable media include any available media that can be accessed by a computing device 301. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 301. Such a processor may execute computer-executable instructions stored on a computer-readable medium.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

What is claimed is:

1. An apparatus comprising:
at least one memory device;
at least one processor coupled to the at least one memory device and configured to perform, based on instructions stored in the at least one memory device:
receiving a service request for a protected resource from a first user device, wherein the service request includes a plurality of device attributes and an authentication token;
selecting, based on a first attribute selection, a first attribute set from the plurality of device attributes contained in the service request, wherein at least one attribute in the plurality of device attributes is not included in the first attribute set and wherein the first attribute selection of the first user device is different from a second attribute selection for a second user device;
determining a derived device identification from the first attribute set;
when a signed device identification of the authentication token contained in the service request and the derived device identification are equal, continue processing the service request;
when the signed device identification is not equal to the derived device identification, rejecting the service request; and
replacing one attribute of the first attribute set with at least one other attribute from the plurality of device attributes to obtain a greater degree of security and preserving uniqueness of the derived device identification.

2. The apparatus of claim 1, wherein the at least one processor is further configured to perform:
when the signed device identification and the derived device identification are equal, sending a challenge to the first user device for authentication information; and
only when the authentication information is determined to be correct, servicing the service request.

3. The apparatus of claim 1, wherein the at least one processor is further configured to perform:
when a signed device identification of the authentication token and the derived device identification are equal, challenging the first user device for authentication information until a degree of authentication is achieved.

4. The apparatus of claim 1, wherein the at least one processor is further configured to perform:
extracting an extracted authentication level from the authentication token; and
processing the service request based on the extracted authentication level.

5. The apparatus of claim 1, wherein the at least one processor is further configured to perform:
receiving an expired authentication token with the service request;
challenging the first user device for authentication information; and
when the authentication is determined to be correct, determining a new expiration time;
inserting the new expiration time in an updated authentication token;
signing the updated authentication token with the signed device identification; and
returning the updated authentication token to the first user device.

6. The apparatus of claim 1, wherein the at least one processor is further configured to perform:
when the signed device identification is not equal to the derived device identification, generating an notification about an authentication failure for the first user device.

7. The apparatus of claim 1, wherein the first attribute set includes a browser attribute.

8. A computer-assisted method for authenticating a user device, the method comprising:
receiving a service request for a protected resource from a user device, wherein the service request includes a plurality of device attributes and a received authentication token;
selecting, based on a first attribute selection, an attribute set from the plurality of device attributes contained in the service request, wherein at least one attribute in the plurality of device attributes is not included in the attribute set and wherein the first attribute selection of the first user device is different from a second attribute selection for a second user device;
determining a derived device identification from the attribute set contained in the plurality of device attributes;
when a signed device identification of the received authentication token contained in the service request and the derived device identification are equal, continue processing the service request; and
when the signed device identification is not equal to the derived device identification, rejecting the service request; and
replacing one attribute of the first attribute set with at least one other attribute from the plurality of device attributes to obtain at least a same degree of security and preserving uniqueness of the derived device identification.

9. The method of claim 8 further comprising:
when the signed device identification and the derived device identification are equal, sending a challenge to the user device for authentication information; and
only when the authentication information is determined to be correct, servicing the service request.

10. The method of claim 8 further comprising:
when a signed device identification of the received authentication token and the derived device identification are equal, challenging the user device for authentication information until a degree of authentication is achieved.

11. The method of claim 8 further comprising:
extracting an extracted authentication level from the received authentication token; and
processing the service request based on the extracted authentication level.

12. A non-transitory computer-readable storage medium storing computer-executable instructions that, when executed, cause a processor at least to perform operations comprising:
receiving a service request for a protected resource from a user device, wherein the service request includes a plurality of device attributes and an authentication token;
selecting, based on a first attribute selection, a first attribute set from the plurality of device attributes contained in the service request, wherein at least one attribute in the plurality of device attributes is not included in the attribute set and wherein the first attribute selection of the first user device is different from a second attribute selection for a second user device;

determining a derived device identification from the first attribute set contained in the plurality of device attributes;

when a signed device identification of the authentication token contained in the service request and the derived device identification are equal, continue processing the service request;

when the signed device identification is not equal to the derived device identification, rejecting the service request; and replacing one attribute of the first attribute set with at least one other attribute from the plurality of device attributes to obtain at least a same degree of security and preserving uniqueness of the derived device identification.

* * * * *